United States Patent Office

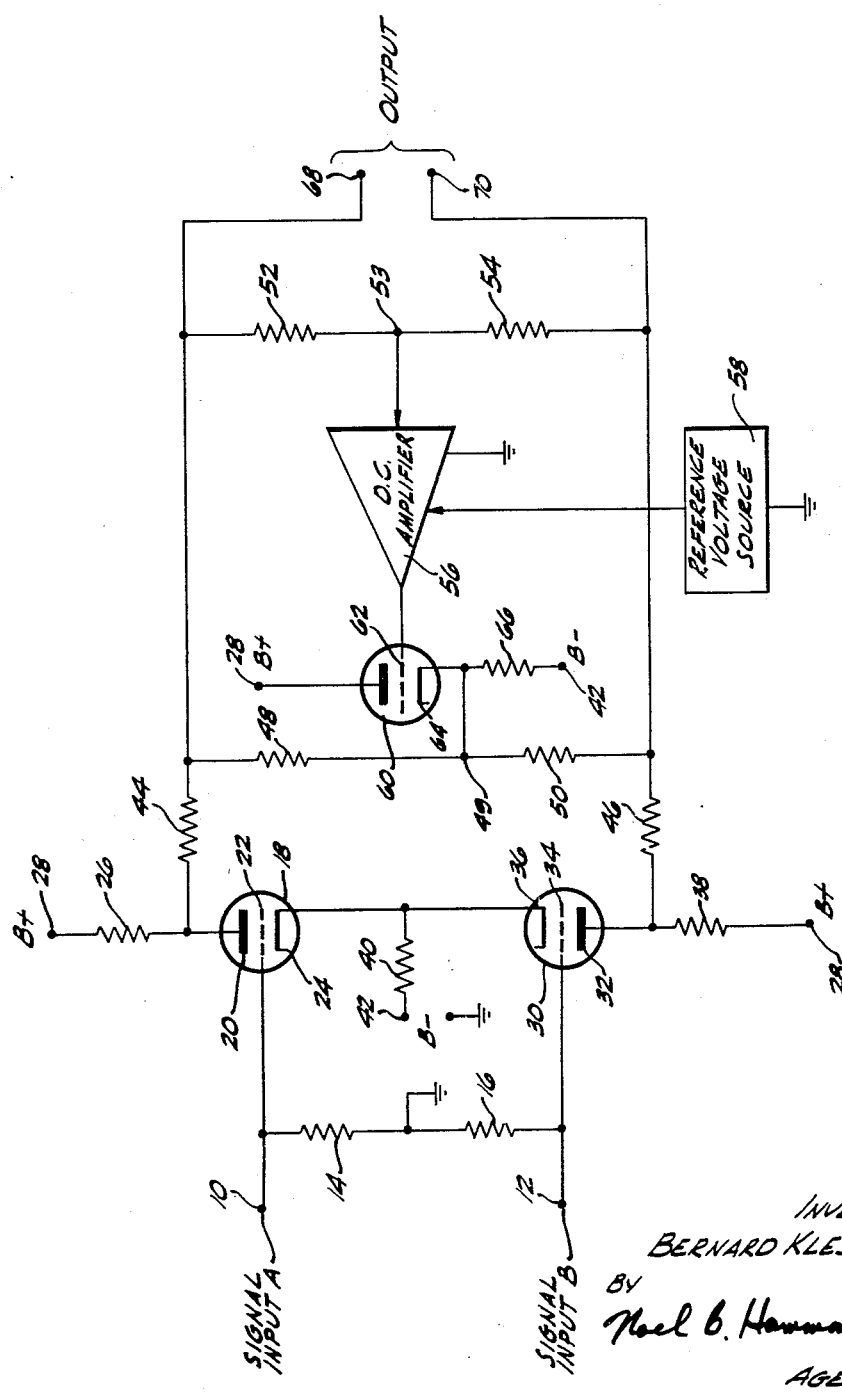
Oct. 11, 1960     B. KLESTADT     2,956,236
LEVEL CHANGING DIRECT COUPLED AMPLIFIER
Original Filed May 10, 1955
INVENTOR.
BERNARD KLESTADT,
BY
Noel C. Howard
AGENT.

2,956,236
Patented Oct. 11, 1960

2,956,236

LEVEL CHANGING DIRECT COUPLED AMPLIFIER

Bernard Klestadt, Los Angeles, Calif., assignor to Hughes Aircraft Company, Culver City, Calif., a corporation of Delaware Continuation of application Ser. No. 507,695, May 10, 1955. This application July 29, 1959, Ser. No. 830,430

4 Claims. (Cl. 330—123)

This invention relates to direct coupled amplifiers, and particularly to circuits for changing the reference voltage level about which a signal varies.

This application is a continuation of applicant's prior copending application Serial No. 507,695, filed May 10, 1955, now abandoned.

When interconnecting electronic equipment, it is sometimes found that the signals developed by one electronic device may not be directly applied to another device, due to an incompatibility in reference voltage levels. Some signals appear at a single terminal with respect to zero voltage or ground, while other signals appear at two terminals which are balanced with respect to ground. Occasionally, the voltage reference level is a positive or negative voltage with respect to ground, rather than zero voltage.

As a specific example, it may be desired to determine the difference between two signals to be applied to test equipment designed to accommodate signals varying about a predetermined reference voltage level, such as ground, for example. To use the test equipment, it may be necessary to change the operating or reference level of the input signals from a positive or negative voltage to zero voltage or ground. It is desirable that the level changing be accomplished without disturbing the source of the signals, particularly where the source is a high impedance circuit.

It is, therefore, an object of the present invention to provide a circuit for changing the voltage reference level of applied input signals.

Another object of this invention is the provision of a circuit for changing a signal appearing at a single terminal with respect to a fixed potential to a signal appearing at two terminals which is balanced with respect to a fixed potential.

Yet another object of the invention is to provide a circuit for changing a signal appearing at two terminals balanced with respect to a fixed potential to a signal appearing at a single terminal with respect to a fixed potential.

Still another object of the invention is the provision of a circuit for combining two signals into a single signal varying about a predetermined voltage reference level.

A further object of the present invention is to provide a level changing circuit whose output voltage reference level is relatively insensitive to arbitrary variations of input voltage reference level.

An even further object of the invention is the provision of a level changing circuit having a high input impedance.

A still further object of the invention is to provide a level changing circuit which accommodates signals of an extremely low frequency as well as higher frequency signals.

A level changing circuit constructed in accordance with this invention may utilize a differential amplifier responsive to input signals. The input signals may vary about relatively high values of voltage, and it may be desired to shift the average voltage value of the signals to ground or some other reference potential. Output signals from the differential amplifier are provided to an impedance network including a first pair of series impedance elements and a second pair of series impedance elements in parallel with the first pair of elements. Output signals may be taken from the junction points of the first and second pairs of series elements. The input circuit of a D.C. (direct-coupled) amplifier is coupled to the midpoint of the second pair of series impedance elements and is also coupled to a source of a predetermined reference voltage. The D.C. amplifier provides a degenerative feedback signal, coupled through a cathode follower, to the midpoint of the first pair of series impedance elements. The feedback loop, and the signal thus provided, compensate for changes in the reference levels of the input signals.

The novel features of the invention, as well as the invention itself, may best be understood when considered in the light of the following description, including the accompanying drawing, the sole figure of which represents an arrangement for practicing the invention.

Referring to the drawing, a level changing circuit constructed in accordance with the invention may derive signals from a pair of signal input terminals, here designated signal input terminal 10 and signal input terminal 12. Signal A from input terminal 10 is applied to a first triode 18 and signal B from input terminal 12 is applied to a second triode 30. Signal A from input terminal 10 is applied to the grid 22 of the first triode 18 and a grid resistor 14 connected to ground. The plate 20 of the first triode 18 is coupled through a plate load resistor 26 to a B+ supply 28. Similarly, signal B is applied to the grid 34 of the second triode 30 and to a grid resistor 16 connected to ground. The plate 32 of the second triode 30 is coupled through a plate load resistor 38 to the B+ supply 28. The cathodes 24, 36 of the first and second triodes 18, 30 are connected together and both are also coupled through a common cathode resistor 40 to a B− supply 42.

The first and second triodes 18, 30 together form a differential amplifier. The resistor 40 in the common cathode connection of the triodes 18, 30 may be replaced, if desired, by a constant current device.

The plates 20, 32 of the triodes 18, 30 are connected to an impedance network. The plate 20 of the first triode 18 is connected to a resistor 44. The plate 32 of the second triode 30 is connected to a resistor 46. The resistors 44 and 46 are connected together between their free ends by a first pair of series impedance elements and a second pair of series impedance elements in parallel with the first pair of elements. The first pair of series impedance elements comprises a pair of series-connected resistors 48 and 50 having matched values of resistance and being joined at junction 49. The second pair of series impedance elements comprises another series-connected pair of resistors 52, 54, also having matched values of resistances and being joined at junction 53. Output terminals 68, 70 for the circuit are connected to the junction of resistors 44, 46 with the two pairs of series elements.

The input terminal of a D.C. amplifier 56 is connected to the junction 53 of the second pair of series elements. A circuit which may be employed for the D.C. amplifier 56 is shown and described as Fig. 5.33 at page 195 of the book "Electronic Analog Computers," by Korn and Korn, published by McGraw-Hill Book Company, Inc. (1952). The D.C. amplifier 56 is also coupled to a reference voltage source 58 which may be any device for providing a predetermined reference voltage. The reference voltage source 58 may be, for example, a D.C. supply, a common ground connection, or a variable source of potential. The output terminal of the D.C. amplifier 56 is coupled to a device having low output impedance, in this case to the grid 62 of a third triode 60 connected as a cathode follower. The plate of the third triode 60 is connected to the B+ supply 28. The cathode 64 is connected to a cathode load resistor 66 the other end of which is connected to the B— supply 42. The cathode 64 is also connected to the junction 49 of the first pair of series impedance elements.

In operation, push-pull or single-ended signals at various voltage reference levels may be applied at the signal input terminals 10, 12 and thence to the first and second triodes 18 and 30. The grid resistors 14 and 16 establish a limiting impedance between the triode grids 22, 34 and ground. The first and second triodes 18 and 30 operate as a differential amplifier. They therefore isolate the signal sources from the remainder of the system, and provide, in effect, a low impedance source. The signal sources connected to the signal input terminals 10 and 12 are thus free of variable loading effects from the present level changing circuit. The coupling of the triode cathodes 24, 36 to the B— supply 42 permits the differential amplifier to operate, within limits, with signals provided at a negative level.

In well known fashion, the differential amplifier provides output potentials dependent upon the levels of the input signals. These output potentials are to be adjusted to vary about the desired reference level which is the potential of the reference voltage source 58. The signals from the differential amplifier are equally attenuated in the resistors 44 and 46, which resistors are of equal value. Changing of the level of the differential voltage to the desired reference level is accomplished by the circuitry connected to the other ends of resistors 44 and 46.

A voltage difference across the second pair of series impedance elements provides a voltage at junction 53 which is the average of the output voltages. Viewed in a transient condition, before a steady state has been achieved, the action is as follows. The average D.C. level, and the desired voltage level from the reference voltage source 58, are applied to the D.C. amplifier 56. The D.C. amplifier 56 provides an output signal which is proportional to the difference between the two potentials. The D.C. amplifier 56 additionally inverts the phase of the signal, so that if the difference is positive the output signal of the D.C. amplifier 56 is negative. The output signal of the D.C. amplifier 56 is used for degenerative feedback and brings the average D.C. output voltage toward the level of the desired reference voltage. The gain of the D.C. amplifier 56, and the attenuation provided by the resistors, are the only factors which must be related so as to provide the desired compensation effects. With this accomplished, the feedback loop is stable at any instant in time when the output signals vary about the desired level.

The cathode follower 60 responsive to the D.C. amplifier 56 provides a low output impedance for ease of changing the voltage level at junction 49 of the first pair of series impedance element. In accordance with well known cathode follower action, the potential of the cathode 64 of the third triode 60 follows the potential of the grid 62, which is the output of the D.C. amplifier 56. Thus, the degenerative feedback voltage is applied to the junction 49 of the first pair of series impedance elements.

Thus, it may be seen that the D.C. potential about which the output signal varies is dependent upon the reference voltage source 58. The average potential of the output signal is in effect measured by the second pair of series resistors 52, 54 and compensated for by degenerative feedback. The average voltage level of the input signals is automatically altered to a desired level, so that the output signal may be applied directly to common types of electronic equipment. It will be apparent that the arrangement may be employed as a phase inverter for single-ended signals supplied to either input. If single-ended signals are used, the output will nonetheless vary around the desired reference potential.

Thus, there has been described an improved level changing circuit for changing the reference level about which a signal varies. Signals derived from a differential amplifier are adjusted by feedback circuitry to vary about a predetermined reference level.

What is claimed is:

1. A circuit for changing a voltage difference between two sources to a voltage variation about a fixed voltage reference level comprising a differential amplifier responsive to the voltage output of each of said two sources, a first impedance network having a first pair of matched resistors connected serially between the voltage outputs of said amplifier, a second impedance network having a second pair of matched resistors connected in parallel with said first impedance network, an adjustable voltage source, means for developing a signal which is proportional to the difference between the potential at the junction between the second pair of matched resistors and the potential of said adjustable source, said means comprising a direct-coupled amplifier having its input coupled to the junction between the resistors of said second impedance network and its output coupled to the junction between the resistors of the first impedance network, said proportional signal being applied to the junction of said first pair of resistors.

2. In combination: a first impedance network having a first pair of matched impedance elements connected serially between a pair of signal sources, a second impedance network having a second pair of series-connected matched impedance elements connected in parallel with said first impedance network, an adjustable voltage source, means for developing a signal which is proportional to the difference between the potential at the junction between the second pair of matched impedance elements and the potential of said adjustable source, said means comprising a direct-coupled amplifier having its input circuit coupled to the junction between the impedance elements of said second impedance network and its output circuit coupled to the junction between the impedance elements of said first impedance network, said proportional signal being applied to the junction of said first pair of impedance elements.

3. A circuit for changing the reference voltage of input signals comprising isolating means responsive to input signals applied between two input signal terminals for developing isolated signals proportional thereto, first and second pairs of matched series-connected impedance elements, each pair respectively coupled to said isolating means and having said isolated signals applied thereacross, the reference voltage of said isolated signals appearing at the junction between said first pair of series-connected elements, a source of a predetermined reference voltage, and feedback means coupled to said source and to the junction between said first pair of elements for developing a difference voltage between the potential at said junction of said second pair of impedance elements and said reference potential, said feedback means being coupled to the junction between said second pair of series-connected elements to apply said difference voltage thereto for causing said isolated signals to vary about said predetermined reference voltage.

4. A circuit for combining two input signals into a single signal varying about a predetermined reference voltage comprising signal combining means responsive to two input signals for developing a single signal, first and second pairs of matched series-connected impedance elements coupled in parallel to said signal combining means and having said single signal applied thereacross, a source of a predetermined reference voltage, and difference means coupled to said source and to the junction between said first pair of elements for developing a difference voltage between the potential at said junction of said first pair of impedance elements and said reference voltage, said difference means being coupled to the junction between said second pair of series-connected elements to apply said difference voltage thereto for causing said single signal to vary about said predetermined reference voltage.

References Cited in the file of this patent

UNITED STATES PATENTS

| | | |
|---|---|---|
| 2,693,572 | Chase | Nov. 2, 1954 |
| 2,777,018 | Russell | Jan. 8, 1957 |

FOREIGN PATENTS

| | | |
|---|---|---|
| 664,658 | Great Britain | Jan. 9, 1952 |